J. DEWRANCE.
PRESSURE GAGE.
APPLICATION FILED MAR. 1, 1910.
987,219.
Patented Mar. 21, 1911.
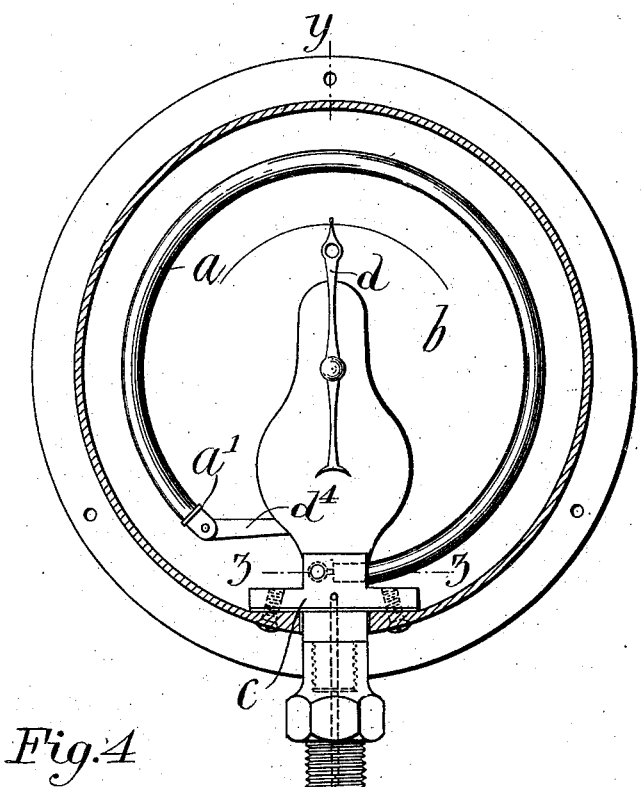
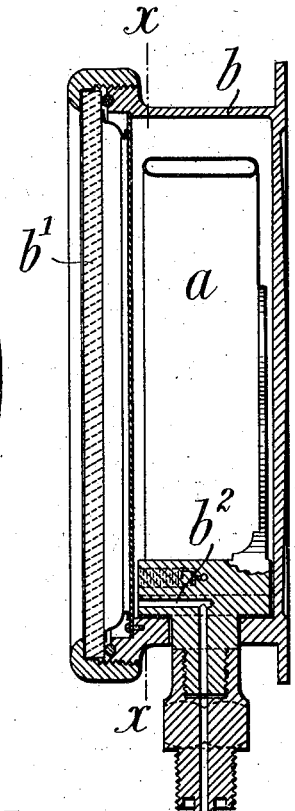
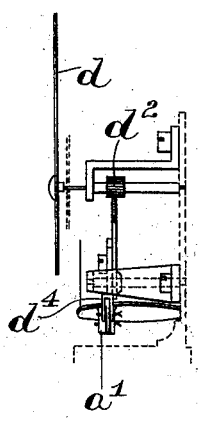
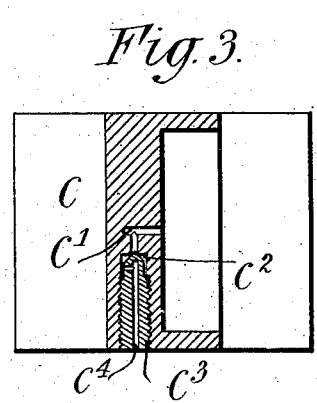
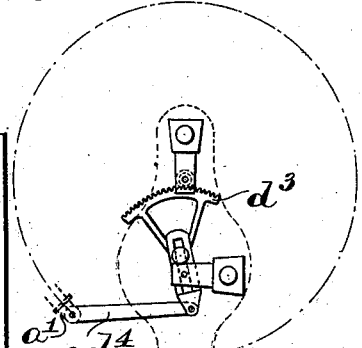
Witnesses
M. E. Eveland
L. E. Johnsine
Inventor
John Dewrance
By his Attorney
N. H. Swearton
THE NORRIS PETERS CO., WASHINGTON, D. C.

UNITED STATES PATENT OFFICE.

JOHN DEWRANCE, OF SOUTHWARK, ENGLAND.

PRESSURE-GAGE.

987,219.  Specification of Letters Patent.  Patented Mar. 21, 1911.

Application filed March 1, 1910. Serial No. 546,647.

*To all whom it may concern:*

Be it known that I, JOHN DEWRANCE, a subject of the King of Great Britain and Ireland, residing at 165 Great Dover street, Southwark, in the county of Surrey, England, have invented new and useful Improvements in Pressure-Gages, of which the following is a specification.

This invention relates to pressure gages, and particularly to the class employed for indicating pressures below that of the atmosphere—commonly called "vacuum gages"; the objects of the invention being to render such instruments independent of changes in either the pressure or the temperature of the ambient atmosphere and thereby to increase their accuracy.

The accompanying drawings illustrate a pressure gage embodying my improvements; Figure 1 being a section on the line $x$—$x$ in Fig. 2, and Fig. 2 a section on the line $y$—$y$ in Fig. 1. Fig. 3 is a section to an enlarged scale, on the line $z$—$z$ in Fig. 1. Fig. 4 is an elevation with parts broken away, showing the indicator and the actuating mechanism for same. Fig. 5 is a plan view of the actuating mechanism showing the method of connecting the indicator or pointer with the free end $a'$ of the Bourdon tube.

In a "Bourdon" gage as ordinarily constructed and applied, the free end of the bent tube is caused to operate a pointer arranged to work over a graduated dial; while the opposite or fixed end of the said tube is placed in communication with the vessel, the internal condition of which, as regards pressure either above or below that of the atmosphere, is required to be indicated. According to my improved method of employing indicating apparatus of the kind described for the purpose of a vacuum gage, the "Bourdon" tube $a$, having been exhausted as perfectly as practicable, is permanently closed, and, together with the pointer and graduated dial, is inclosed in air-tight chamber $b$ provided with a transparent front $b'$. This chamber is placed by way of the passage $b^2$ in communication with the vessel, the vacuous condition of which is to be indicated. As the pressure (*i. e.* vacuum) to which the interior of the inclosing chamber $b$ is subjected changes, so the difference between such pressure and that prevailing in the interior of the tube $a$ varies; such change being attended by a corresponding movement in the free end $a'$ of the tube and a corresponding change in the dial reading.

An indicator or pointer $d$ is adapted to travel across the dial $e$ in response to the movements of the free end $a'$ of the Bourdon tube, the same being fixed upon a pivot $d'$ which is actuated in the usual manner through the agency of a fixed pinion $d^2$ and a ratchet $d^3$, the latter being pivotally connected by a connecting rod $d^4$ to the free end $a'$ of the Bourdon tube.

According to this method of working, the interior of the Bourdon tube is subjected to a permanent vacuum, while its exterior is exposed to the variable vacuum of the vessel with which the apparatus is in communication; but neither externally nor internally is the tube exposed to the pressure of the ambient atmosphere. Under these circumstances, the apparatus is not affected by changes of barometric pressure. The confinement of the "Bourdon" tube in an inclosed chamber has, moreover, the effect of protecting the former from the effect of changes which may occur in the temperature of the atmosphere.

To enable the Bourdon tube $a$ to be exhausted, the base $c$ wherein the tube is mounted is formed with a passage $c'$ which communicates between the said tube and a valve chamber $c^2$. Within this chamber is screwed a valve $c^3$ formed with a passage $c^4$ which communicates between the front of the base $c$ and the chamber $c^2$. The inner end of the valve $c^3$ seats in and controls the passage $c'$. To enable the tube $a$ to be exhausted, the valve $c^3$ is opened and communication established between the passage $c'$ and the exhaust pump; this passage being again closed when the exhaustion has been effected.

What I claim as my invention, and desire to secure by Letters Patent is:—

1. For use as a pressure or vacuum gage, a permanently exhausted Bourdon tube provided with indicating mechanism and a chamber which is air-tight to the surrounding atmosphere but open to the vessel, the condition of which is to be indicated; the said Bourdon tube and indicating mechanism being inclosed in said chamber.

2. A pressure gage comprising a Bourdon tube closed at both ends after having been exhausted, pointer-actuating mechanism operated by one end of said tube, the opposite end thereof being fixed, and a casing inclosing said tube and actuating mechanism, said casing being open to the vessel the condition of which is to be indicated, but airtight to the surrounding atmosphere.

3. A pressure gage comprising a Bourdon tube having one of its ends connected with pointer-actuating mechanism, a base wherein the opposite end of said tube is mounted, a valved passage in said base communicating with said tube, and a casing inclosing said tube, and its appurtenances, said casing being open to the vessel the condition of which is to be indicated, but air-tight to the surrounding atmosphere.

In testimony whereof I have signed my name to this specification in the presence of two subscribing witnesses.

JOHN DEWRANCE.

Witnesses:
HERBERT D. JAMESON,
RIPLEY WILSON.

Copies of this patent may be obtained for five cents each, by addressing the "Commissioner of Patents, Washington, D. C."